US012678940B2

(12) United States Patent
Shimizu

(10) Patent No.: US 12,678,940 B2
(45) Date of Patent: Jul. 14, 2026

(54) TENSION ESTIMATION DEVICE, LIFE EVALUATION DEVICE, AND ROBOT SYSTEM

(71) Applicant: FANUC CORPORATION, Yamanashi (JP)

(72) Inventor: Ryouta Shimizu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 434 days.

(21) Appl. No.: 18/251,825

(22) PCT Filed: Nov. 19, 2021

(86) PCT No.: PCT/JP2021/042594

§ 371 (c)(1),
(2) Date: May 4, 2023

(87) PCT Pub. No.: WO2022/113901

PCT Pub. Date: Jun. 2, 2022

(65) Prior Publication Data

US 2023/0405807 A1     Dec. 21, 2023

(30) Foreign Application Priority Data

Nov. 26, 2020    (JP) ................................. 2020-196020

(51) Int. Cl.
B25J 9/10            (2006.01)
(52) U.S. Cl.
CPC .................................. B25J 9/1045 (2013.01)
(58) Field of Classification Search
CPC ........ B25J 9/1045; B25J 9/104; B25J 9/1674; B25J 19/06; G01L 5/04; G05B 23/0283;
(Continued)

(56) References Cited

U.S. PATENT DOCUMENTS 9,205,560 B1    12/2015  Edsinger et al.

FOREIGN PATENT DOCUMENTS

CN        105424356 A      3/2016
CN        109746939 A      5/2019
(Continued)

OTHER PUBLICATIONS

JP 2015093360 A English Translation (Year: 2015).*
(Continued)

*Primary Examiner* — Basil T. Jos
(74) *Attorney, Agent, or Firm* — Studebaker Brackett PLLC

(57)                ABSTRACT

Provided are: a tension estimation device capable of accurately estimating the tension of a belt; a life evaluation device capable of accurately evaluating the life of a transmission mechanism, from the tension of the belt; and a robot system comprising these. The tension estimation device comprises: a transmission mechanism that transmits power via a belt; at least one motor disposed in the vicinity of the belt; a motor calorific value calculation unit that calculates the motor calorific value on the basis of at least one out of the current value or rotation speed for at least one motor; a frictional calorific value calculation unit that calculates the frictional calorific value of the transmission mechanism, on the basis of at least one among the current value or rotation speed for at least one motor and a friction coefficient for at least one shaft disposed in the vicinity of the belt; and a belt tension estimation unit that estimates the tension of the belt on the basis of the motor calorific value and the frictional calorific value.

14 Claims, 5 Drawing Sheets

(58) Field of Classification Search
      CPC ........... G05B 2219/32234; G05B 2219/37351;
                                   G01M 13/023
      See application file for complete search history.

(56)                  References Cited

FOREIGN PATENT DOCUMENTS

| | | | |
|---|---|---|---|
| CN | 110696041 | A | 1/2020 |
| EP | 1273899 | A2 | 1/2003 |
| JP | 2004-020388 | A | 1/2004 |
| JP | 2005-156394 | A | 6/2005 |
| JP | 2007-309951 | A | 11/2007 |
| JP | 2014-092198 | A | 5/2014 |
| JP | 2015093360 | A * | 5/2015 |
| JP | 2020-008466 | A | 1/2020 |
| JP | 2020-008472 | A | 1/2020 |
| JP | 6694016 | B2 | 5/2020 |
| KR | 10-1924724 | B1 | 12/2018 |

OTHER PUBLICATIONS

English Translation for JP-2015093360-A (Year: 2013).*
International Search Report issued in PCT/JP2021/042594; mailed
Feb. 8, 2022.

* cited by examiner

TEMPERATURE [DEGREES]

TENSION ESTIMATION DEVICE, LIFE EVALUATION DEVICE, AND ROBOT SYSTEM

TECHNICAL FIELD

The present invention relates to a tension estimation device, a life evaluation device, and a robot system.

BACKGROUND ART

In a robot, it is important to estimate life of a drive system of the robot and foresee a breakdown before the robot breaks down. For example, a technique is disclosed in Patent Document 1 in which temperatures of components of a robot are estimated and life of the components is estimated with high accuracy.

Patent Document 1: Japanese Unexamined Patent Application, Publication No. 2020-8472

DISCLOSURE OF THE INVENTION

Problems to be Solved by the Invention

There have been known multi-axis robots such as a vertical multi-joint robot including a transmission mechanism that transmits power of a motor to a movable portion through a belt. In the robot in which the belt is provided in the transmission mechanism, when temperatures of members constituting the robot rises due to behavior of the robot, the members (mainly cast metal or the like) expand, and thus an inter-axis distance of the belt increases. As a result, tension of the belt increases, which may shorten the life of the drive system including the transmission mechanism. Therefore, in a machine including the transmission mechanism that transmits the power of the motor to the movable portion through the belt, it is necessary to estimate the life of the drive system in consideration of changes in tension of the belt due to the behavior.

Therefore, it is desirable to provide a tension estimation device capable of estimating the tension of the belt with high accuracy, a life evaluation device capable of estimating the life of the transmission mechanism with high accuracy from the tension of the belt, and a robot system.

Means for Solving the Problems

A tension estimation device according to an aspect of the present disclosure includes: a transmission mechanism that transmits power through a belt; at least one motor disposed close to the belt; a motor heating value calculation unit that calculates a motor heating value based on at least one of a current value and a rotation speed of the at least one motor; a friction heating value calculation unit that calculates a friction heating value of the transmission mechanism, based on at least one of the current value and the rotation speed of the at least one motor and a friction coefficients of at least one axis disposed close to the belt; and a belt tension estimation unit that estimates tension of the belt based on the motor heating value and the friction heating value.

A life evaluation device according to an aspect of the present disclosure includes: the tension estimation device; and a life estimation unit that estimates life of the transmission mechanism based on the tension of the belt estimated by the tension estimation device.

A robot system according to an aspect of the present disclosure includes: a robot including a plurality of motors, a plurality of movable portions, and one or more transmission mechanisms that transmit power of at least one of the plurality of motors to the plurality of movable portions through a belt; a control device that controls the plurality of motors of the robot; and the life evaluation device.

Effects of the Invention

According to aspects of the present disclosure, it is possible to provide a tension estimation device capable of estimating tension of a belt with high accuracy, a life evaluation device capable of estimating life of a transmission mechanism with high accuracy from the tension of the belt, and a robot system including the tension estimation device and the life evaluation device.

BRIEF DESCRIPTION OF THE DRAWINGS

FIG. 4 is a block diagram showing components of a tension estimation device and a life evaluation device according to a second embodiment in the robot system;

FIG. 5 is a block diagram showing components of a tension estimation device and a life evaluation device according to a third embodiment in the robot system.

PREFERRED MODE FOR CARRYING OUT THE INVENTION

Figure 1:
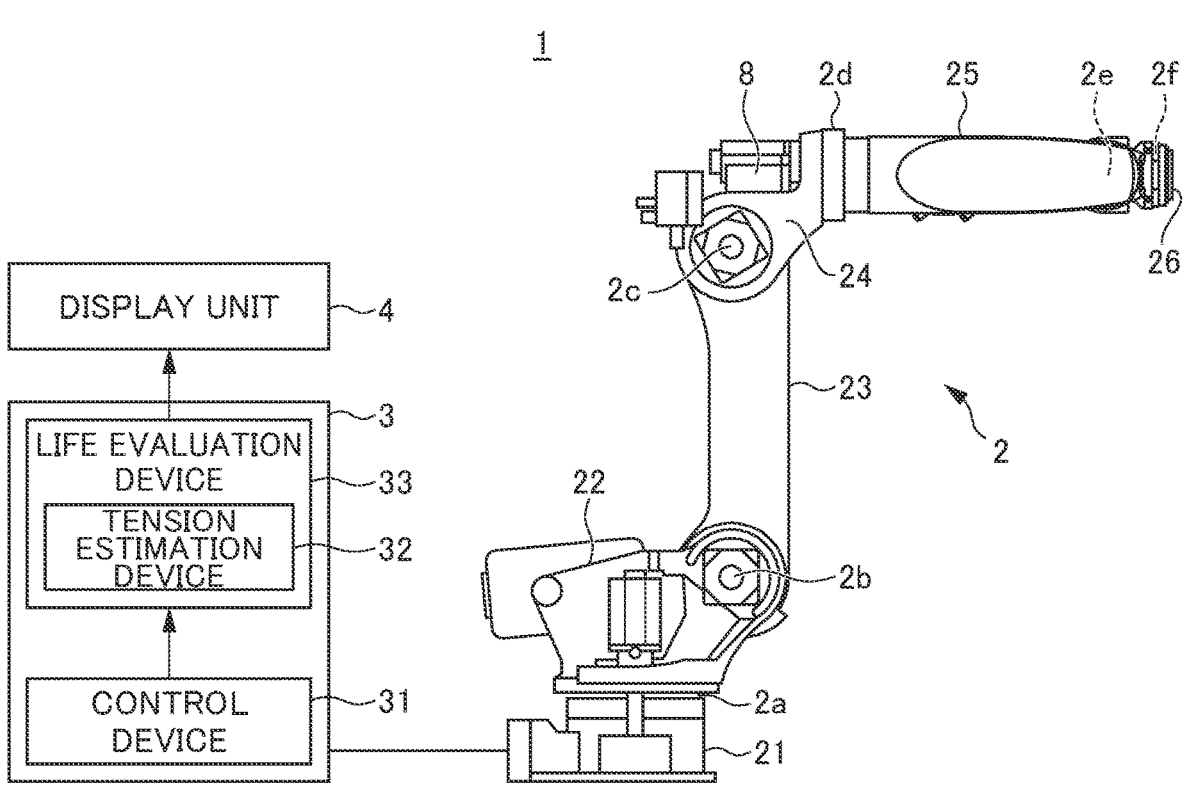
FIG. 1 is an overall configuration diagram showing a robot system according to an embodiment.

Embodiments of a tension estimation device, a life evaluation device, and a robot system of the present disclosure will be described in detail below with reference to the drawings. As shown in FIG. 1, a robot system 1 includes a robot 2, a robot controller 3 that controls the robot 2, and a display unit 4 connected to the robot controller 3.

The robot 2 of the present embodiment is a vertical multi-joint robot including a plurality of movable portions. Specifically, the robot 2 is a 6-axis vertical multi-joint robot including 6 axes of a J1 axis 2a, a J2 axis 2b, a J3 axis 2c, a J4 axis 2d, a J5 axis 2e, and a J6 axis 2f as movable portions. The robot 2 includes a base portion 21 installed on a floor surface or the like, a first turning portion 22 provided on the base portion 21, a first arm portion 23 attached to the first turning portion 22, a second turning portion 24 attached to the first arm portion 23, a second arm portion 25 attached to the second turning portion 24, and a wrist unit 26 attached to a tip of the second arm portion 25.

The first turning portion 22 is rotatable in a horizontal direction by the J1 axis 2a with respect to the base portion 21. The first arm portion 23 is swingable in a front-rear direction by the J2 axis 2b with respect to the first turning portion 22. The second turning portion 24 is swingable in an up-down direction by the J3 axis 2c with respect to the first arm portion 23. The second arm portion 25 is rotatable around an axis along a longitudinal direction of the second arm portion 25 by the J4 axis 2d with respect to the second turning portion 24. The wrist unit 26 is swingable in an up-down direction by the J5 axis 2e with respect to the second arm portion 25, and is rotatable around an axis intersecting the J5 axis 2*e* by the J6 axis 2*f*.

Figure 2:
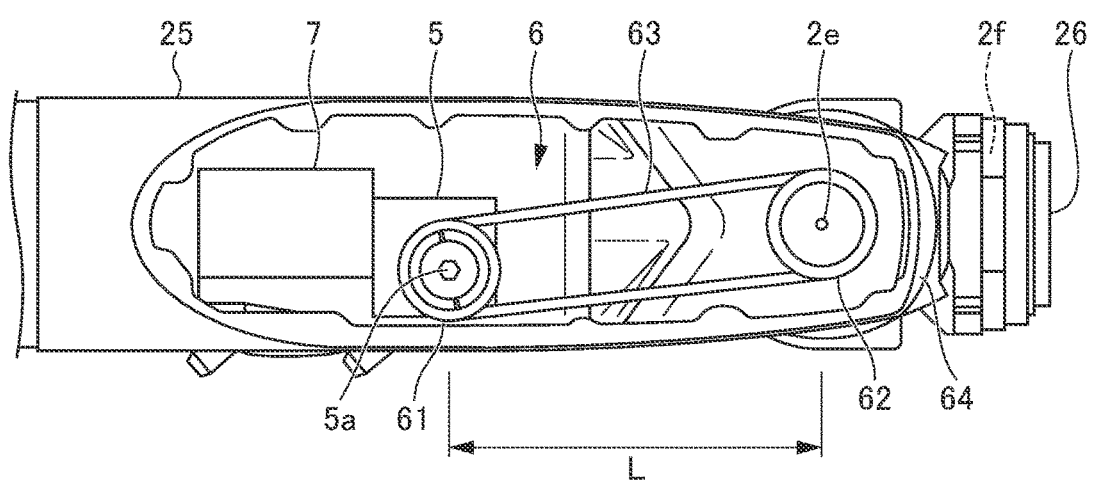
FIG. 2 is a diagram showing an internal configuration of a second arm portion of the robot shown in FIG. 1.

The robot 2 is provided, on the axes, with motors (not shown in FIG. 1) for driving the axes (J1 axis 2*a* to J6 axis 2*f*) and transmission mechanisms that transmit power of the motors to the axes. For example, FIG. 2 shows the inside of the second arm portion 25 of the robot 2. Inside the second arm portion 25, a J5 axis motor 5 is disposed to swing the wrist unit 26 around the J5 axis 2*e*. Power of the J5 axis motor 5 is transmitted to the J5 axis 2*e* via the transmission mechanism 6.

The transmission mechanism 6 includes a first pulley 61 attached to an output axis 5*a* of the J5 axis motor 5, a second pulley 62 attached to the J5 axis 2*e*, a belt 63 bridged between the first pulley 61 and the second pulley 62, and a decelerator 64 that decelerates a rotation of the second pulley 62. The output axis 5*a* and the J5 axis 2*e* are rotatably supported by bearings (not shown), respectively. These bearings (not shown) in the transmission mechanism 6 are members, a life of which changes according to a change in tension of the belt.

As shown in FIG. 2, inside the second arm portion 25, a J6 axis motor 7 is also provided close to the J5 axis motor 5 to drive the J6 axis 2*f*. Power of the J6 axis motor 7 is transmitted to the J6 axis 2*f* via a transmission mechanism (not shown). Further, as shown in FIG. 1, the second turning portion 24 is provided with a J4 axis motor 8 to drive a fourth axis 2*d*.

The life of the transmission mechanism provided in the robot 2 is affected by a temperature of a component site where the transmission mechanism is disposed. For example, in the case of the transmission mechanism 6 provided inside the second arm portion 25 shown in FIG. 2, the life of the transmission mechanism 6 is affected by the temperature of the second arm portion 25 itself. In other words, when the temperature of the second arm portion 25 rises due to the driving of the robot 2, a member (mainly cast metal or the like) constituting the second arm portion 25 expands, and an inter-axis distance L between the output axis 5*a* of the J5 axis motor 5 and the J5 axis 2*e* shown in FIG. 2 increases. Accordingly, tension of the belt 63 becomes larger, and a load on the first pulley 61 and the second pulley 62 increases. As a result, the life of the transmission mechanism 6 is reduced.

The temperature rise in the component site of the robot 2 can be caused due to not only heat generated from the motor disposed inside the component site, but also heat generated from another component site disposed close to the component site. For example, in the second arm portion 25 shown in FIG. 2, the temperature rise of the second arm portion 25 can be caused due to not only heat generated from the J5 axis motor 5 disposed inside the second arm portion 25, but also heat generated from the J6 axis motor 7 for driving the J6 axis 2*f* and frictional heat generated by behavior of each of the J4 axis 2*d*, the J5 axis 2*e*, and the J6 axis 2*f* which are friction sites. Therefore, when a user wants to estimate the tension of the belt 63 of the transmission mechanism 6 provided in the second arm portion 25 and the life of the transmission mechanism 6, it is also necessary to consider the heat generated from these component sites disposed close to the belt 63.

The robot controller 3 is electrically connected to the robot 2 and comprehensively controls the behavior of the robot 2. The robot controller 3 includes a control device 31 that controls respective portions such as motors of the robot 2, a tension estimation device 32 that estimates the tension of the belt 63 provided at the transmission mechanism 6 of the robot 2, and a life evaluation device 33 that estimates the life of the transmission mechanism 6 of the robot 2.

The display unit 4 is configured by a liquid crystal display screen, for example. The display unit 4 is connected to the robot controller 3 in a wired or wireless manner, and display various information transmitted from the robot controller 3 on the screen.

Figure 3:
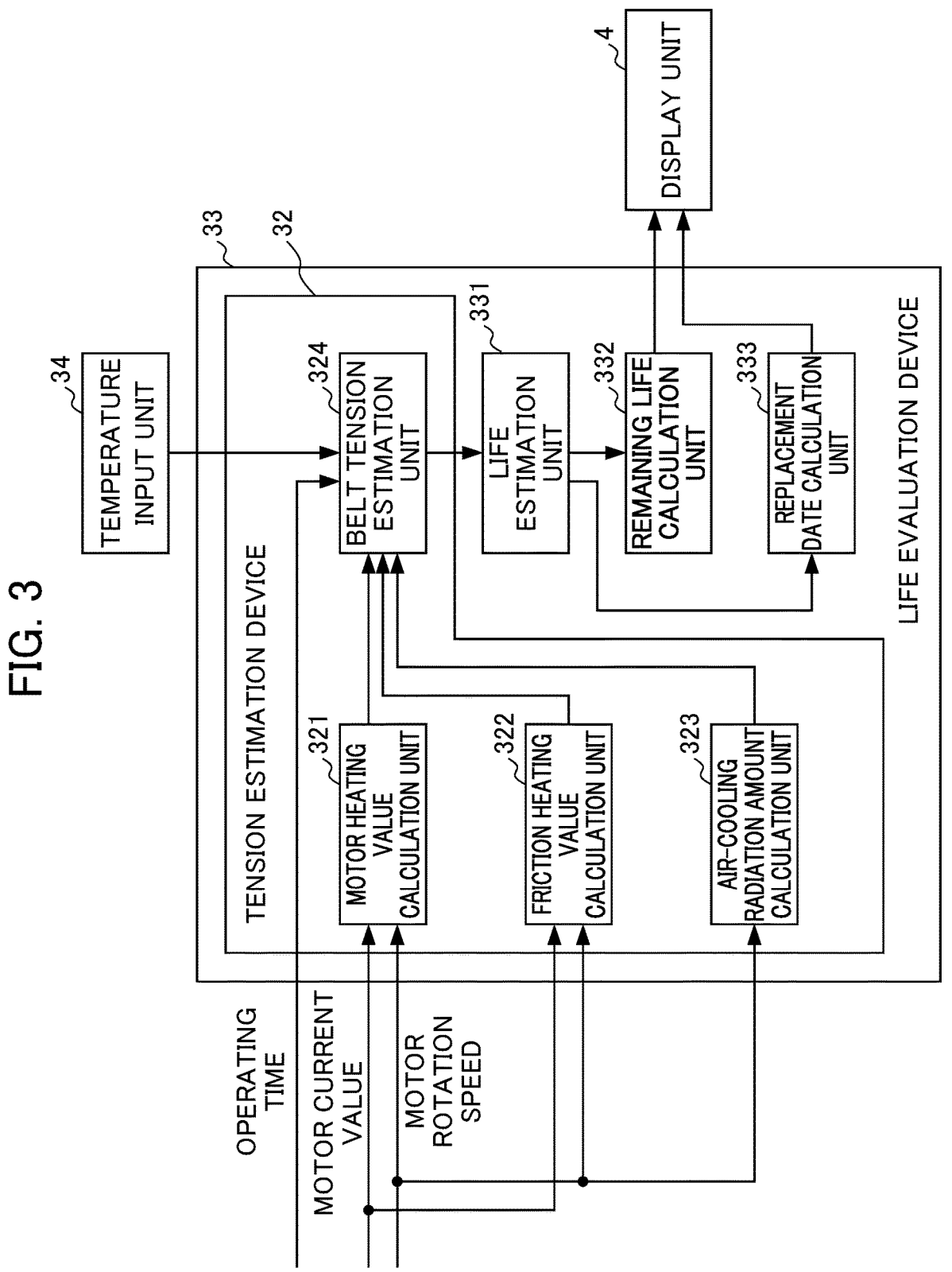
FIG. 3 is a block diagram showing components of a tension estimation device and a life evaluation device according to a first embodiment in the robot system.

Next, the tension estimation device 32 and the life evaluation device 33 provided in the robot controller 3 will be described with reference to FIG. 3. As shown in FIG. 3, the tension estimation device 32 includes a motor heating value calculation unit 321, a friction heating value calculation unit 322, an air-cooling radiation amount calculation unit 323, and a belt tension estimation unit 324.

The motor heating value calculation unit 321 calculates a motor heating value based on a state quantity of the motor input from the control device 31. The control device 31 inputs, to the motor heating value calculation unit 321, at least one of a motor current value and a motor rotation speed of at least one motor disposed close to the belt, which is a target for tension estimation. As shown in FIG. 3, the present embodiment is configured in which both the motor current value and the motor rotation speed are input from the control device 31.

The motor disposed close to the belt is a motor disposed close enough to the belt that the heat generated by driving of the motor affects the tension of the belt. For example, in the case of the second arm portion 25 of the robot 2 shown in FIG. 2, the J5 axis motor 5 and the J6 axis motor 7 are disposed close to the belt 63. The tension of the belt 63 is affected by heat generated by the J5 axis motor 5 and the J6 axis motor 7. Therefore, in a case of estimating the tension of the belt 63 of the second arm portion 25, at least one of motor current values and motor rotation speeds of the J5 axis motor 5 and the J6 axis motor 7 is input to the motor heating value calculation unit 321.

The motor heating value calculation unit 321 calculates, based on at least one of the motor current value and the motor rotation speed to be input, a motor heating value of a motor that drives an axis, which is a target for calculation, using Formula (1) below.

$$M_n = a \times C_n + b \times V_n + c \times (V_n)^2 \qquad (1)$$

where, $M_n$: motor heating value of Jn axis motor [W], $C_n$: motor current value of Jn axis motor [Ap], $V_n$: motor rotation speed of Jn axis motor [rpm], and a, b, c: coefficients The friction heating value calculation unit 322 calculates a friction heating value in the transmission mechanism, based on at least one of the motor current value input from the control device 31, the motor rotation speed, and the friction coefficient of at least one axis disposed close to the belt which is a target for tension estimation. The motor current value and the motor rotation speed input to the friction heating value calculation unit 322 are the motor current value and the motor rotation speed of at least one motor disposed close to the belt which is the target for tension estimation. For example, in the case of the second arm portion 25 of the robot 2 shown in FIG. 2, the motor current value and the motor rotation speed input to the friction heating value calculation unit 322 are the motor current value and the motor rotation speed of the J5 axis motor 5 and the J6 axis motor 7. The axis is a site that generates frictional heat due to driving. For example, in the case of the second arm portion 25 of the robot 2 shown in

5

FIG. 2, frictional heat generated by driving of the J4 axis 2*d*, the J5 axis 2*e*, and the J6 axis 2*f* may affect the tension of the belt 63.

As shown in FIG. 3, at least one of the motor current value, the motor rotation speed, and the friction coefficient of the axis is input to the friction heating value calculation unit 322 from the control device 31. The friction coefficient of the axis is a unique value for each axis, and is stored in advance in a storage unit (not shown) of the control device 31 as a value for each axis. The friction heating value calculation unit 322 calculates a friction heating value in the transmission mechanism using Formula (2) below, based on at least one of the motor current value, the motor rotation speed, and the friction coefficient.

$$F_n = k_1 \times C_n V_n + k_2 \times V_n + k_3 \times (V_n)^2 \qquad (2)$$

where, $F_n$: friction heating value of axis to be driven by Jn axis motor [W], $C_n$: motor current value of Jn axis motor [Ap], $V_n$: motor rotation speed of Jn axis motor [rpm], and k: friction coefficient.

The air-cooling radiation amount calculation unit 323 calculates an air-cooling radiation amount of the transmission mechanism based on the moving speed of the transmission mechanism. The air-cooling radiation amount is a radiation amount generated due to a relative speed with surrounding air when the arm portion moves in air due to the behavior of the robot 2. The air-cooling radiation amount is proportional to a moving speed rate ($V_{wcp}$) of the transmission mechanism. The moving speed rate ($V_{wcp}$) of the transmission mechanism is calculated by Formula (3) below. In the robot 2, the speed of the arm portion is uniquely determined from the amount of minute angle change of the J1 axis 2*a* to the J6 axis 2*f*.

$$V_{wcp} = \text{(Speed at specific position of arm portion)} /$$
$$\text{(Maximum speed at specific position of arm}$$
$$\text{portion)} \qquad (3)$$

The belt tension estimation unit 324 calculate the tension of the belt in the transmission mechanism using a belt tension estimation formula indicated by Formula (4) below, based on the motor heating value calculated by the motor heating value calculation unit 321, the friction heating value calculated by the friction heating value calculation unit 322, and the air-cooling radiation amount calculated by the air-cooling radiation amount calculation unit 323. Here, $T_0$ and a, b, c, and d indicate model-specific coefficients that do not depend on the movement of the robot 2.

[Math. 1]

$$T = T_0 + \left\{ \sum_{n=m_1} (a_n F_n) + \sum_{n=m_2} (b_n M_n) \right\}^c + dV_{wcp} \sum_{n=m_3} F_n \qquad (4)$$

where,

T: estimated tension of belt, $T_0$: initial tension of belt, $F_n$: friction heating value of an axis to be driven by Jn axis motor [W], $M_n$: motor heating value of Jn axis motor [W], $V_{wcp}$: moving speed rate of transmission mechanism, m: any combinatorial integer, and a, b, c, d: coefficients.

In the robot 2, for example, the tension of the belt 63 of the transmission mechanism 6 of the second arm portion 25 is affected by the motor heating values of the J5 axis motor 5 and the J6 axis motor 7 disposed close to the belt 63 and the frictional heating values of the J4 axis 2*d*, J5 axis 2*e*, and the J6 axis 2*f* which are the axes disposed close to the belt 63. Therefore, in this case, the motor heating values of the J5 axis motor 5 and the J6 axis motor 7 are used as the motor heating value M, and the frictional heating values of the J4 axis 2*d*, J5 axis 2*e*, and the J6 axis 2*f* are used as the friction heating value F in formula (4) above.

Here, a description will be given with respect to a case of estimating the tension of the belt 63 of the transmission mechanism 6 in the second arm portion 25 when the robot 2 performs the following behavior.

TABLE 1

|  | J4 AXIS | J5 AXIS | J6 AXIS |
|---|---|---|---|
| MOTOR CURRENT VALUE $C_n$ [Ap] | 10 | 12.5 | 7.5 |
| MOTOR ROTATION SPEED $V_n$ [rpm] | 1500 | 1500 | 1500 |

In such behavior of the robot 2, when a=0.5, b=0.005, and c=0.000005, a motor heating value $M_5$ of the J5 axis motor 5 for driving the J5 axis 2*e* is 25 [W] ($M_5$=25 [W]) and a motor heating value $M_6$ of the J6 axis motor 7 for driving the J6 axis 2*f* is 22.5 [W] ($M_6$=22.5 [W]), from Formula (1).

In the J4 axis 2*d*, when a friction coefficient $k_{a4}$ for a mean of motor current speeds is 0.005, a friction coefficient $k_{b4}$ for a mean of motor rotation speeds is 0.10, and a friction coefficient $k_{c4}$ for a square mean value of the motor rotation speed is 0.0001, a friction heating value $F_4$ of the J4 axis 2*d* is 450 [W] ($F_4$=450 [W]) from Formula (2). Similarly, in the J5 axis 2*e*, when a friction coefficient $k_{a5}$ for a mean of motor current speeds is 0.0001, a friction coefficient $k_{b5}$ for a mean of motor rotation speeds is 0.02, and a friction coefficient $k_{c5}$ for a square mean value of the motor rotation speed is 0.00001, a friction heating value $F_3$ of the J5 axis 2*e* is 54.4 [W] ($F_5$=54.4 [W]). In the J6 axis 2*f*, when a friction coefficient $k_{a6}$ for a mean of motor current speeds is 0.001, a friction coefficient $k_{b6}$ for a mean of motor rotation speeds is 0.08, and a friction coefficient $k_{c6}$ for a square mean value of the motor rotation speed is 0.00001, a friction heating value $F_6$ of the J6 axis 2*f* is 153.8 [W] ($F_5$=153.8 [W]).

By substitution of these values into Formula (4), the tension T of the belt 63 is obtained. In Formula (4), when $T_0$=150 [N], $m_1$=4·5·6, $m_2$=5~6, $m_3$=4·5·6, $a_4$=0.1, $a_5$=0, $a_6$=1.2, $b_5$=0.5, $b_6$=0.5, c=0.8, d=−0.5, and $V_{wcp}$=0.1, it is estimated that the tension T of the belt 63 is 200.8 [N] (T=200.8 [N]). Thus, the tension estimation device 32 can estimate the tension of the belt with higher accuracy.

In the belt tension estimation formula of Formula (4), at least one of the initial tension $T_0$ of the belt and the coefficients a, b, c, and d is a parameter that changes with room temperature. Since the belt tension estimation formula includes the parameter that changes with room temperature, the tension of the belt can be estimated in consideration of the room temperature. Therefore, the tension of the belt can be estimated with higher accuracy. The room temperature is input by a room temperature input unit 34 provided in the robot controller 3, as shown in FIG. 3. The room temperature may be manually input through the room temperature input unit 34 by an operator, or may be automatically input from a detected value of a temperature sensor (not shown).

Further, in the belt tension estimation formula of Formula (4), at least one of the initial tension $T_0$ of the belt and the coefficients a, b, c, and d may be a parameter that changes with the lapse of time or the operating time of the robot 2. This is because the tension of the belt may decrease over time. The operating time of the robot 2 is input from the control device 31 to the belt tension estimation unit 324, as shown in FIG. 3. For example, when the decrease in tension of the belt per hour [h] after the robot 2 operates is defined as A [N/h], estimated tension of the belt including the change with the lapse of time can be calculated by Formula (5) below.

$$T'=T_0-At \qquad (5)$$

where,

T': estimated tension of the belt including the change with the lapse of time [N], $T_0$: initial tension of the belt [N], A: change with the lapse of time per hour [N/h], and t: operating time [h].

Thus, coefficients in the belt tension estimation formula of Formula (4) are corrected according to the lapse of time or the operating time of the robot 2. Therefore, since the belt tension estimation formula includes the parameter that changes with the lapse of time or the operating time of the robot 2, the tension of the belt can be estimated in consideration of the lapse of time or the operating time of the robot 2. Therefore, the tension of the belt can be estimated with higher accuracy.

Further, the estimated tension of the belt due to the change with lapse of time may be simply calculated by Formula (6) below.

$$T'=f(t)×T \qquad (6)$$

where,

T': estimated tension of the belt including the change with lapse of time [N],

T: estimated tension of the belt [N], and f(t): coefficient dependent on the operating time.

As shown in FIG. 3, the life evaluation device 33 includes the tension estimation device 32 described above, and further includes a life estimation unit 331, a remaining life calculation unit 332, and a replacement date calculation unit 333.

The life estimation unit 331 estimates life of the transmission mechanism based on the estimated tension value estimated by the belt tension estimation unit 324 of the tension estimation device 32. For example, in the case of the transmission mechanism 6 of the second arm portion 25 shown in FIG. 2, the life of the transmission mechanism 6 is estimated from the estimated tension value of the belt 63 estimated by the tension estimation device 32.

Generally, it is said that the life of the transmission mechanism is proportional to a cube of the tension of the belt. The life estimation unit 331 estimates the life of the transmission mechanism using Formula (7) below, based on the estimated tension value of the belt obtained by the tension estimation device 32. For example, in a case of a transmission mechanism of which life reaches 100 [%] in operation for 10000 [h] at tension of the belt being 250 [N], a life progress rate (estimated life value) of the transmission mechanism in operation for 5000 [h] at an estimated tension value of the belt being 200 [N] is 26 [%] from Formula (7) below. Accordingly, the life estimation unit 331 can estimate that the current life of the transmission mechanism has reached 26%.

8

[Math. 2]

$$Sg = \left(\frac{T}{250}\right)^3 × \frac{t}{10000} × 100[\%] \qquad (7)$$

where, $S_q$: estimated life value of transmission mechanism [%],

T: estimated tension of belt [N], and t: operating time [h].

The remaining life calculation unit 332 calculates the remaining life of the transmission mechanism based on the estimated life value of the transmission mechanism calculated by the life estimation unit 331. Accordingly, the life evaluation device 33 can notify the operator of the remaining life of the transmission mechanism. Specifically, the remaining life calculation unit 332 calculates remaining life $S_r$ of the transmission mechanism using Formula (8) below, based on the estimated life value of the transmission mechanism calculated by the life estimation unit 331.

$$S_r=100-S_g[\%] \qquad (8)$$

where, $S_r$: remaining life [%], and $S_g$: estimated life value of transmission mechanism [%].

Information on the remaining life calculated by the remaining life calculation unit 332 is sent to the display unit 4 and displayed on the display unit 4. The display unit 4 may display the remaining life value itself sent from the remaining life calculation unit 332, or display a warning when the calculated remaining life value becomes smaller than a preset threshold value. The remaining life calculation unit 332 or the display unit 4 may have a function of determining whether the remaining life value becomes smaller than the threshold value.

The replacement date calculation unit 333 calculates an estimated replacement date of the transmission mechanism based on the estimated life value of the transmission mechanism calculated by the life estimation unit 331. Accordingly, the life evaluation device 33 can notify the operator of an appropriate replacement date of the transmission mechanism before the transmission mechanism breaks down. Specifically, the replacement date calculation unit 333 calculates a replacement date (recommended replacement date) of the transmission mechanism using Formula (9) below, based on the estimated life value of the transmission mechanism calculated by the life estimation unit 331. Information on the replacement date calculated by the replacement date calculation unit 333 is sent to the display unit 4 and displayed on the display unit 4. However, a method of calculating the replacement date of the transmission mechanism is not limited to Formula (9) below, and any other approximate calculation method may be adopted.

[Math. 3]

$$D = \frac{S_{g0} - S_g(0)}{S_g(0) - S_g(d)} × a \qquad (9)$$

where,

D: number of days until replacement date [days], $S_q(d)$: estimated life value of transmission mechanism until d day [%], $S_g(0)$: estimated life value of current transmission mechanism [%], $S_{g0}$: replacement line of remaining life [%], and a: coefficient.

As described above, the life evaluation device 33 can accurately evaluate the life of the transmission mechanism, based on the estimated tension value of the belt obtained by the tension estimation device 32. Since the life evaluation device 33 evaluates the life of the transmission mechanism based on the tension of the belt obtained by the tension estimation device 32, it is possible to evaluate the life with high accuracy in consideration of a load applied to the transmission mechanism due to the increase in the tension of the belt.

The belt tension estimation unit 324 of the tension estimation device 32 may generate a learned model for estimating the tension of the belt from the motor heating value and the friction heating value by machine learning using the motor heating value calculated by the motor heating value calculation unit 321 and the friction heating value calculated by the friction heating value calculation unit 322. Accordingly, the tension of the belt can be estimated with high accuracy using a learned model based on various patterns of data on the motor heating value and the friction heating value.

Figure 4:
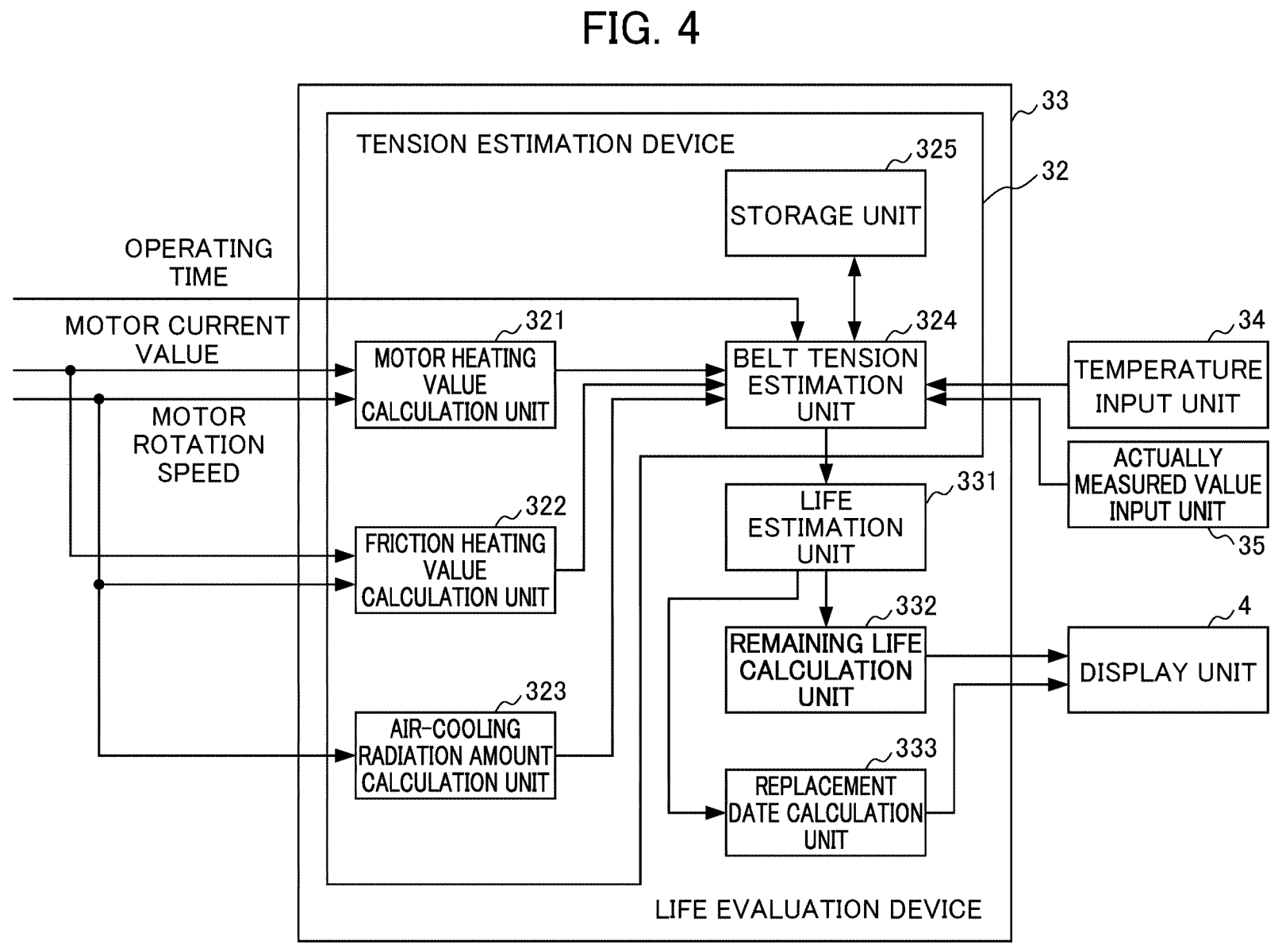

When the belt tension estimation unit 324 generates the learned model, the tension estimation device 32 may include a storage unit 325 that stores the learned model generated by the machine learning, as shown in FIG. 4. In this case, the belt tension estimation unit 324 can estimate the tension of the belt using the learned model stored in the storage unit 325 based on the motor heating value and the friction heating value. Accordingly, since the tension of the belt is estimated using the learned model stored in the storage unit 325, the tension of the belt can be estimated with high accuracy even when the learned model is not generated from the beginning.

The machine learning may be supervised learning using training data in which the motor heating value and the friction heating value used as input data are associated with the actually measured value of the tension of the belt used as a label. Accordingly, the actually measured value of the tension of the belt is used as a correct answer, and thus the tension of the belt with respect to the input data can be estimated with high accuracy. As shown in FIG. 4, the actually measured value of the tension of the belt is manually input by the operator through an actually measured value input unit 35 provided in the robot controller 3.

Figure 5:
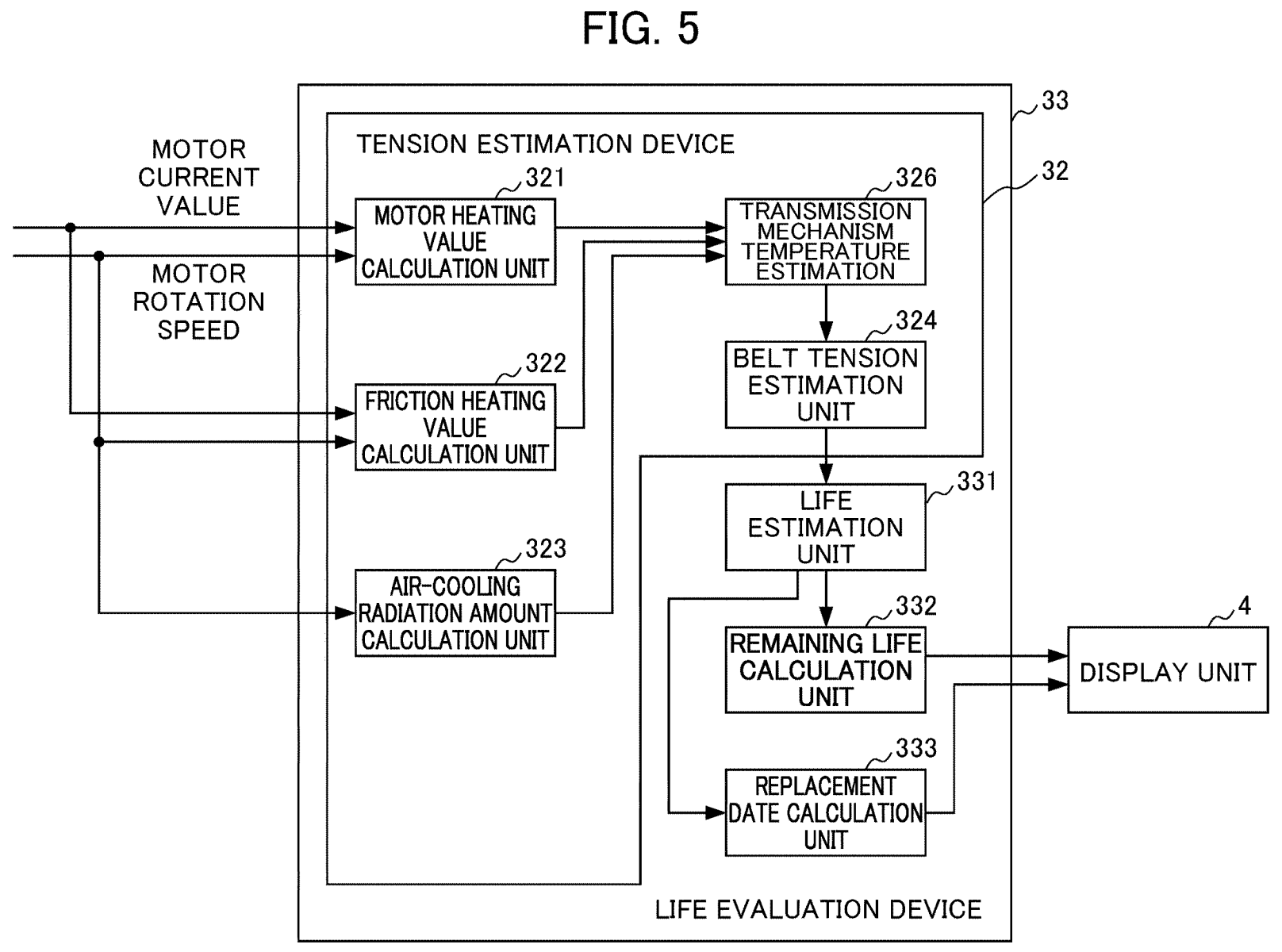
Figure 6:
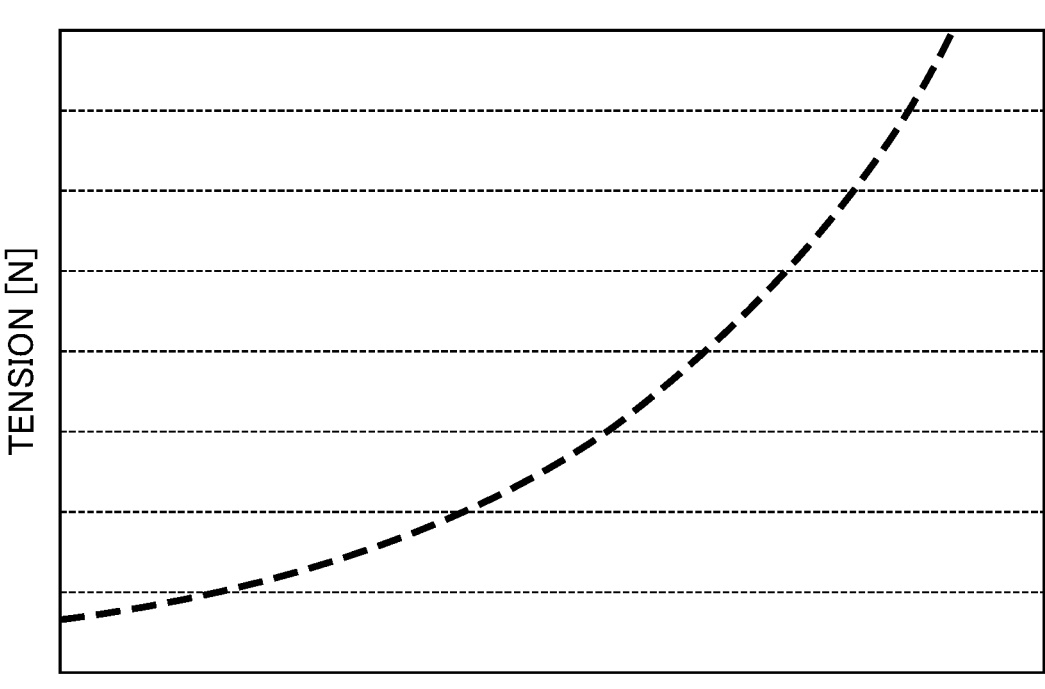
FIG. 6 is a graph showing a relationship between a temperature of a transmission mechanism and tension of a belt.

As shown in FIG. 6, the tension of the belt and the temperature have a one-to-one relationship. For this reason, the belt tension estimation unit 324 of the tension estimation device 32 may estimate the tension of the belt from the temperature of the transmission mechanism instead of calculating the estimated tension value of the belt using Formula (4) above. In this case, the tension estimation device 32 can include a transmission mechanism temperature estimation unit 326 as shown in FIG. 5.

The transmission mechanism temperature estimation unit 326 estimates the temperature of the transmission mechanism using Formula (10) below, based on the motor heating value calculated by the motor heating value calculation unit 321, the friction heating value calculated by the friction heating value calculation unit 322, and the air-cooling radiation amount calculated by the air-cooling radiation amount calculation unit 323.

[Math. 4]

$$T_p = T_r + c\left\{\sum_{n=m_1} a_n F_n\right\}^d + e \times \left\{\sum_{n=m_2} b_n M_n\right\}^f + g_1 W_1 + g_2 W_2 \quad (10)$$

where,
$T_p$: estimated temperature of transmission mechanism,
$T_r$: room temperature,
$F_n$: friction heating value of axis to be driven by Jn axis motor [W],
$M_n$: motor heating value of Jn axis motor [W],
$W_1$: air-cooling radiation amount,
$W_2$: heating value of another generation source,
a, b, c, d, e, f, g: coefficients,
m: any combinatorial integer.

The belt tension estimation unit 324 estimates the tension of the belt from a graph of FIG. 6, based on the temperature of the transmission mechanism estimated by the transmission mechanism temperature estimation unit 326. Accordingly, the tension of the belt can be simply estimated. Similarly to the tension estimation device 32 shown in FIG. 4, the tension estimation device 32 including the transmission mechanism temperature estimation unit 326 may also have a configuration in which the learned model is generated by machine learning.

In each of the above-described embodiments, the motor heating value calculation unit 321 calculates the motor heating value based on the motor current value and the motor rotation speed. However, the motor heating value calculation unit 321 may more simply calculate the motor heating value based on at least one of the motor current value and the motor rotation speed.

In each of the above-described embodiments, the friction heating value calculation unit 322 calculates the friction heating value in the transmission mechanism 6 based on the motor current value, the motor rotation speed, and the friction coefficient of the transmission mechanism 6. However, the friction heating value calculation unit 322 may simply calculate the friction heating value in the transmission mechanism 6 based on at least one of the motor current value, the motor rotation speed, and the friction coefficient of the transmission mechanism 6.

In each of the above-described embodiments, the tension estimation device 32 may be a simple device not including the air-cooling radiation amount calculation unit 323. Further, the belt tension estimation unit 324 may simply estimate the tension of the belt based on two heating values of the motor heating value and the friction heating value.

EXPLANATION OF REFERENCE NUMERALS

1 robot system
2 robot (machine)
2a J1 axis (movable portion)
2b J2 axis (movable portion)
2c J3 axis (movable portion)
2d J4 axis (movable portion)
2e J5 axis (movable portion)
2f J6 axis (movable portion)
31 control device
32 tension estimation device
321 motor heating value calculation unit
322 friction heating value calculation unit
324 belt tension estimation unit
323 air-cooling radiation amount calculation unit
325 storage unit
326 transmission mechanism temperature estimation unit

33 life evaluation device
331 life estimation unit
332 remaining life calculation unit
333 replacement date calculation unit
5 J5 axis motor (first motor)
7 J6 axis motor (second motor)
6 transmission mechanism
63 belt

The invention claimed is:

1. A tension estimation device comprising:
a transmission mechanism that transmits power through a belt;
at least one motor disposed close to the belt;
a motor heating value calculation unit that calculates a motor heating value based on at least one of an electric current value and a rotation speed of the at least one motor input from a control device that controls the at least one motor;
a friction heating value calculation unit that calculates a friction heating value of the transmission mechanism, based on at least one of the electric current value and the rotation speed input from the control device that controls the at least one motor and a friction coefficient of at least one axis disposed close to the belt; and
a belt tension estimation unit that estimates tension of the belt based on the motor heating value and the friction heating value.

2. The tension estimation device according to claim 1, further comprising an air-cooling radiation amount calculation unit that calculates an air-cooling radiation amount based on a moving speed of the transmission mechanism, wherein
the belt tension estimation unit estimates the tension of the belt based on the motor heating value, the friction heating value, and the air-cooling radiation amount.

3. The tension estimation device according to claim 2, wherein the belt tension estimation unit estimates the tension of the belt using a belt tension estimation formula as follows:

[Math. 1]

$$T = T_0 + \left\{ \sum_{n=m_1} (a_n F_n) + \sum_{n=m_2} (b_n M_n) \right\}^c + dV_{wcp} \sum_{n=m_3} F_n$$

where,
T: estimated tension of the belt,
$T_0$: initial tension of the belt,
$F_n$: friction heating value of an axis to be driven by an n-th motor,
$M_n$: motor heating value of the n-th motor,
$V_{wcp}$: moving speed rate of the transmission mechanism,
m: any combinatorial integer, and
a, b, c, d: coefficient.

4. The tension estimation device according to claim 3, wherein, in the belt tension estimation formula, at least one of the initial tension of the belt and the coefficient is a parameter that changes with room temperature.

5. The tension estimation device according to claim 3, wherein, in the belt tension estimation formula, at least one of the initial tension of the belt and the coefficient is a parameter that changes with a lapse of time or an operating time.

6. The tension estimation device according to claim 2, further comprising a transmission mechanism temperature estimation unit that estimates a temperature of the transmission mechanism based on the motor heating value, the friction heating value, and the air-cooling radiation amount, wherein
the belt tension estimation unit estimates the tension of the belt based on the temperature of the transmission mechanism estimated by the transmission mechanism temperature estimation unit.

7. The tension estimation device according to claim 1, wherein the transmission mechanism is made of a member, a life of which changes as the tension of the belt changes.

8. The tension estimation device according to claim 1, wherein the belt tension estimation unit generates a learned model for estimating the tension of the belt from the motor heating value and the friction heating value by machine learning using the motor heating value and the friction heating value.

9. The tension estimation device according to claim 8, further comprising a storage unit that stores the learned model generated by the machine learning, wherein
the belt tension estimation unit estimates the tension of the belt using the learned model stored in the storage unit, based on the motor heating value and the friction heating value.

10. The tension estimation device according to claim 8, wherein the machine learning is supervised learning using training data in which the motor heating value and the friction heating value used as input data are associated with an actually measured value of the tension of the belt used as a label.

11. A life evaluation device comprising:
the tension estimation device according to claim 1; and
a life estimation unit that estimates life of the transmission mechanism based on the tension of the belt estimated by the tension estimation device.

12. The life evaluation device according to claim 11, further comprising a remaining life calculation unit that calculates remaining life of the transmission mechanism based on the life of the transmission mechanism estimated by the life estimation unit.

13. The life evaluation device according to claim 11, further comprising a replacement date calculation unit that calculates an estimated replacement date of the transmission mechanism based on the life of the transmission mechanism estimated by the life estimation unit.

14. A robot system comprising:
a robot including a plurality of motors, a plurality of movable portions, and one or more transmission mechanisms that transmit power of at least one of the plurality of motors to the plurality of movable portions through a belt;
a control device that controls the plurality of motors of the robot; and
the life evaluation device according to claim 11.

* * * * *